United States Patent [19]

Dixon

[11] Patent Number: 4,740,134
[45] Date of Patent: Apr. 26, 1988

[54] PICK AND PLACE MACHINE
[75] Inventor: Paul H. Dixon, Belvidere, Ill.
[73] Assignee: Dixon Automatic Tool, Inc., Rockford, Ill.
[21] Appl. No.: 915,240
[22] Filed: Oct. 3, 1986
[51] Int. Cl.$^4$ ............................................... B66C 1/00
[52] U.S. Cl. .................... 414/733; 414/225; 414/917; 198/468.2; 198/468.6; 74/37; 74/89.2
[58] Field of Search .................. 414/733, 749–753, 414/728, 222, 225, 917; 198/468.6, 468.2, 468.4, 468.5; 74/37, 89.2

[56] References Cited

U.S. PATENT DOCUMENTS

| 1,766,573 | 6/1930 | Westin | 414/733 |
| 3,902,606 | 9/1975 | Ronbeck | 414/733 |
| 3,921,822 | 11/1975 | Dixon | 414/753 |
| 4,400,984 | 8/1983 | Ronbeck | 414/749 X |
| 4,411,587 | 10/1983 | Niki | 414/752 |
| 4,441,852 | 4/1984 | Dixon | 414/733 |
| 4,530,637 | 7/1985 | Mason et al. | 414/752 X |
| 4,574,941 | 3/1986 | Tsuge et al. | 414/733 X |
| 4,585,389 | 4/1986 | Watanabe et al. | 414/752 |
| 4,589,819 | 5/1986 | Shirao | 414/752 |
| 4,634,338 | 1/1987 | Tsuge et al. | 414/733 X |

FOREIGN PATENT DOCUMENTS 0061504 10/1982 European Pat. Off. .

Primary Examiner—Robert J. Spar
Assistant Examiner—Jennifer Doyle
Attorney, Agent, or Firm—Leydig, Voit & Mayer, Ltd.

[57] ABSTRACT

A machine for raising parts vertically from a pick-up station, for shifting the parts horizontally toward a delivery station, and for lowering the parts vertically into the delivery station. The machine includes a parts handling head pivotally supported on the lower end portions of a pair of parallel links whose upper end portions are pivotally connected to a vertically movable slide. A crank is oscillated back and forth by a reciprocating actuator and acts to effect pivoting and vertical shifting of the links while a cam follower is connected to one of the links and coacts with a slotted cam plate to control such pivoting and shifting. In one embodiment, reciprocating motion of the actuator is converted into oscillating motion of the crank by a rack and pinion and, in another embodiment, the motion conversion is effected by cogged belts coacting with toothed sprockets.

10 Claims, 3 Drawing Sheets

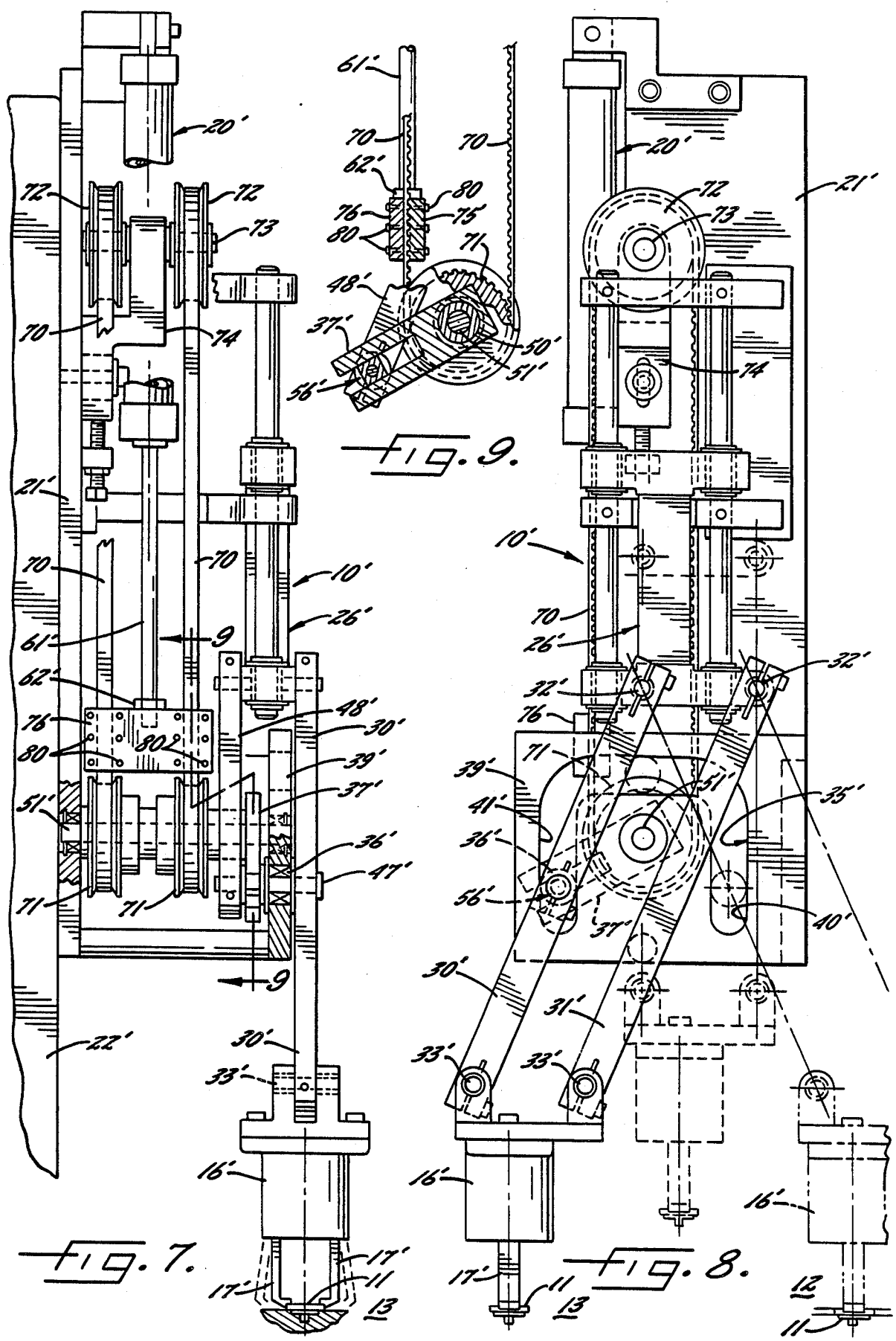

PICK AND PLACE MACHINE

BACKGROUND OF THE INVENTION

This invention relates to a machine for picking up a part at a first station, for moving the part along a generally straight path toward a second station and then for moving the part along a substantially right-angled path to positively place the part in the second station. Such a machine is commonly referred to as being a pick and place machine. With some such machines, the part at the first station also is positively picked up from the first station and is initially moved at right angles to the path between the stations before being shifted along such path. Thus, the part moves in a generally U-shaped or C-shaped path as it travels between the stations.

Many different types of pick and place machines exist in the prior art. Typical examples are disclosed in Dixon U.S. Pat. No. 3,921,822; Dixon U.S. Pat. No. 4,441,582 and Shirao U.S. Pat. No. 4,589,819.

The general aim of the present invention is to provide a new and improved pick and place machine which is of relatively simple construction, which is comparatively fast, quiet and smooth in operation, which is relatively compact while being capable of transferring the part through a relatively long distance between stations, and which can be easily adjusted or modified to change either the distance the part moves along each portion of the path or to change the configuration of the path itself.

A more detailed object of the invention is to achieve the foregoing by providing a new and improved pick and place machine in which a single reversible actuator coacts with a cam, a crank, a slide and a pair of parallel links which uniquely interact to effect fast but smooth shifting of a parts handling head along a desired path in response to operation of the actuator.

Another object of the invention is to provide a pick and place machine in which the single actuator for shifting the parts handling head is in the form of a reciprocating actuator which is of comparatively inexpensive construction and which is relatively simple to control.

The invention also resides in the novel use of a flexible toothed belt in conjunction with the actuator to convert the reciprocating motion of the actuator into oscillating motion for shifting the parts handling head, the belt being very quiet in operation and enabling the stroke of the head to be easily adjusted in small and precise increments.

These and other objects and advantages of the invention will become more apparent from the following detailed description when taken in conjunction with the accompanying drawings.

BRIEF DESCRIPTION OF THE DRAWINGS

FIG. 7 is a side elevational view of another embodiment of a pick and place machine incorporating the features of the invention.

FIG. 8 is a front elevational view of the machine shown in FIG. 7.

FIG. 9 is a fragmentary cross-section taken substantially along the line 9—9 of FIG. 7.

DETAILED DESCRIPTION OF THE PREFERRED EMBODIMENTS

Figure 1:
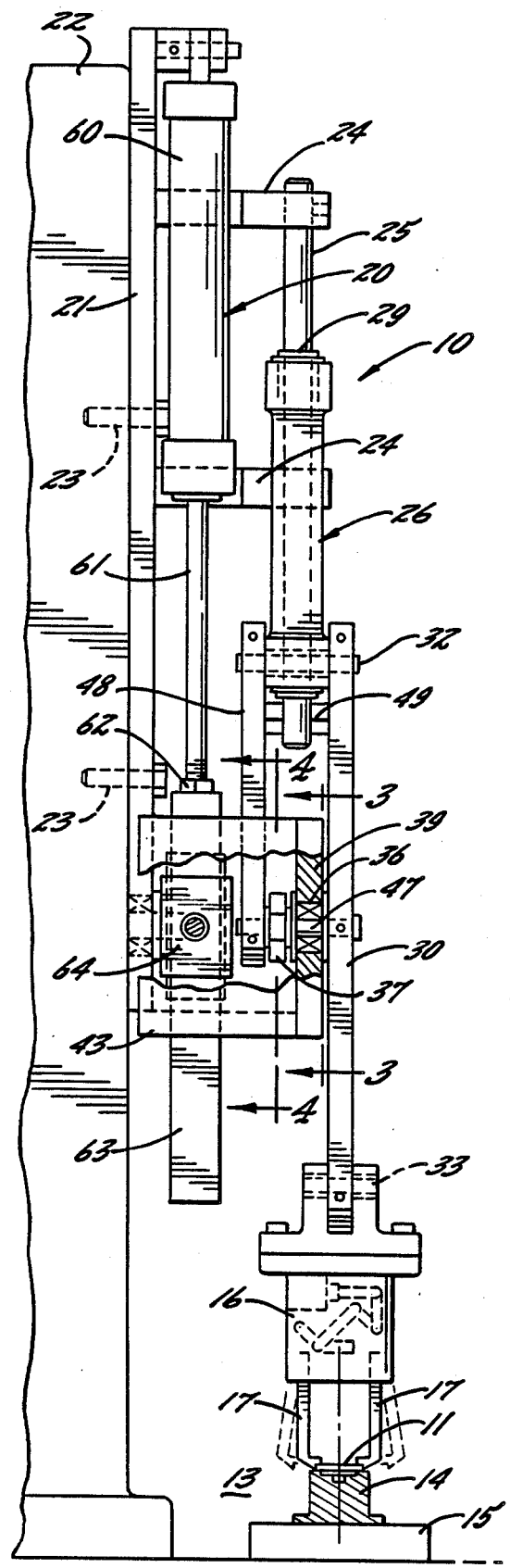
FIG. 1 is a side elevational view of one embodiment of a new and improved pick and place machine incorporating the unique features of the present invention.

For purposes of illustration, the invention has been shown in the drawings as embodied in a pick and place machine 10 for gripping a part 11 at a first station 12, for shifting the part along a generally straight path toward a second station 13, and then for moving the part along a generally right-angled path to positively place the part in the second station prior to releasing the part therein. The parts 11 have been shown herein merely by way of example as being stepped-diameter collars which are advanced single file along a horizontal track (not shown) to the pick-up station 12. In this particular instance, the track is located substantially at the same elevation as the upper end portion of a workpiece 14 which is supported on a fixture 15 in the delivery station 13. Each part 11 is first raised substantially vertically at the pick-up station 12, is shifted substantially horizontally toward the delivery station 13 and then is lowered vertically into the delivery station in order to positively dowel the lower end portion of the part into an upwardly opening pocket in the upper end of the workpiece 14. Thus, in this instance, the part moves along an inverted U-shaped path as the part is transferred from the station 12 to the slation 13. The two vertical legs of the path are equal in length.

Any suitable mechanism may be used for gripping and releasing the parts 11. The mechanism which has been shown is a parts handling head 16 of the same general type as disclosed in Dixon U.S. Pat. No. 4,441,582. Such a head includes a pair of swingable jaws 17 which close upon the part in the pick-up station 12, grip the part as it is transferred to the delivery station 13 and then open to release the part after the latter has been placed on the workpiece 14.

The present invention contemplates the provision of a pick and place machine 10 which is characterized particularly by the use of a single actuator 20 for shifting the parts handling head 16 between the stations 12 and 13 and which shifts the head quickly, quietly and smoothly. Moreover, the machine displaces the head horizontally through a distance which is large when compared to the vertical displacement and may be easily modified to change either or both of the horizontal and vertical displacements and to change the shape of the path through which the head is shifted.

More specifically, the machine 10 includes a main support in the form of a vertical plate 21 which is attached to an upright column 22 by screws 23 (FIG. 1). Vertically spaced brackets 24 are attached rigidly to and project outwardly from the plate 21 and support a pair of stationary, vertically extending and parallel guide rods 25. A generally L-shaped slide 26 with a vertical arm 27 and a horizontal arm 28 is supported on the rods by bushings 29 and is adapted to move upwardly and downwardly on the rods. The upper end portions of two upright and parallel links 30 and 31 are pivotally connected to the horizontal arm 28 of the slide 26 at 32 while the lower end portions of the links are pivotally connected at 33 to the upper end portion of the head 16. Up and down movement of the slide 26 is transferred through the links to move the head 16 upwardly and downwardly. When the parallel links are swung about the upper pivots 32, the head is moved substantially horizontally.

A cam 35, a cam follower 36 and a crank 37 (FIGS. 3 to 5) coact to produce up and down movement of the links 30 and 31 and to control swinging of the links for purposes of moving and controlling the head 16. In this instance, the cam 35 (FIG. 3) is a track defined by the opposing edges of a slot in the shape of an inverted U formed in a vertical cam plate 39, the cam slot 35 having spaced vertical legs 40 and 41 spanned by an upper horizontal leg 42. The cam plate 39 is spaced outwardly from and is disposed in opposing relation with the main support plate 21 (see FIG. 5) and is secured rigidly to the latter by way of two plate-like connecting members 43 and 44 welded to the main support plate. Screws 45 fasten the cam plate detachably to the connecting members.

The cam follower 36 (FIGS. 3 and 5) is in the form of a circular roller or bearing sized to fit closely within the cam slot 35 and captivated therein by a pair of washers 46. Supporting the cam follower 36 to turn freely about a horizontal axis is a pin 47 which extends through the follower and the washers and which is connected to the link 30 midway between the upper and lower ends of the link. The opposite end portion of the pin is supported by the lower end portion of a shorter rear link 48 (FIGS. 1 and 5) whose upper end is pivotally connected to the horizontal arm 24 of the slide 26 to swing about the same axis 32 as the upper end portion of the link 30. A connecting bar 49 (FIG. 1) extends between and is welded to the upper end portions of the links 30 and 48 below the pivot 32 and coacts with the pin 47 to hold the links in rigid alignment with one another.

Figure 4:
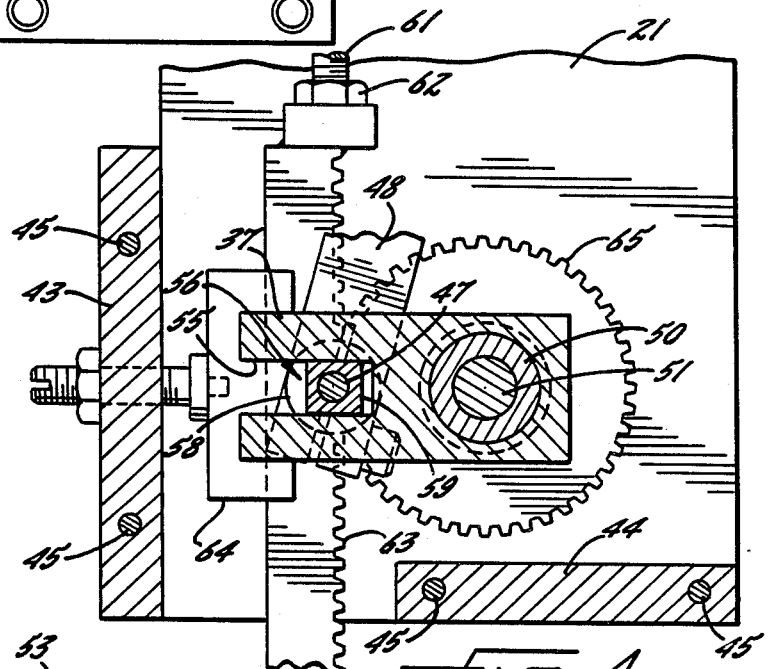
Figure 5:
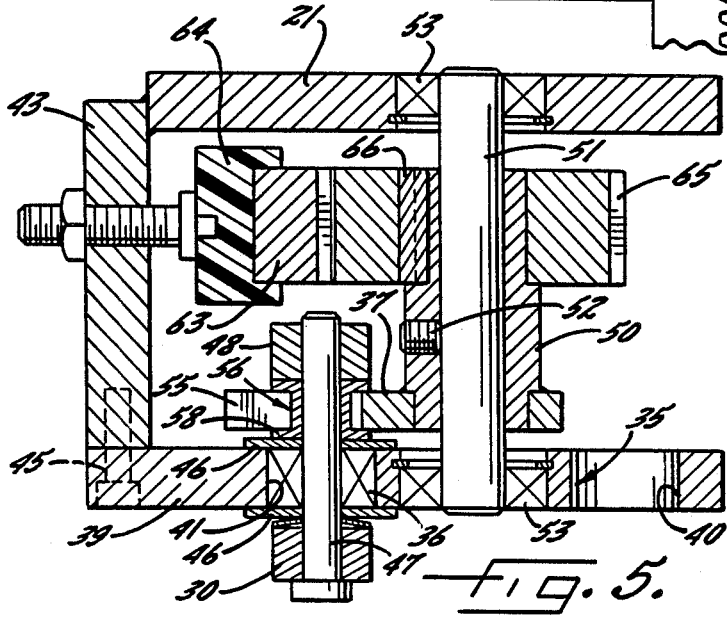
FIG. 5 is an enlarged cross-section taken substantially along the line 5—5 of FIG. 2.

As shown most clearly in FIGS. 4 and 5, the crank 37 is in the form of a rotatable arm having one end portion rigid with a tubular hub 50 which, in turn, is telescoped over a horizontal shaft 51 and is secured thereto by a set screw 52. Bearings 53 in the support plate 21 and the cam plate 39 journal the shaft 51 to rotate about a horizontal axis extending parallel to the axis of the pin 47.

Figure 6:
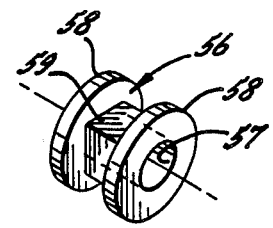
FIG. 6 is a perspective view of one of the parts shown in FIGS. 4 and 5.

The free end portion of the crank 37 is formed with an elongated slot 55 (FIG. 4) of rectangular cross-section. Fitting within the slot 55 and telescoped over the pin 47 is a bushing 56 (FIG. 6) formed with a cylindrical bore 57 which permits relative rotation between the bushing and the pin. The bushing is retained in the slot 55 by flanges 58 on the ends of the bushing and, as shown in FIGS. 4 and 6, that portion 59 of the bushing between the flanges is square and fits snugly in the slot so as to hold the bushing against rotation in the slot while permitting the bushing to slide along the slot. Thus, the slot and the bushing coact to transmit motion of the crank 37 to the link 30 by way of the pin 47 while allowing the pin to slide back and forth relative to the crank to accommodate swinging of the link during turning of the crank.

Figure 2:
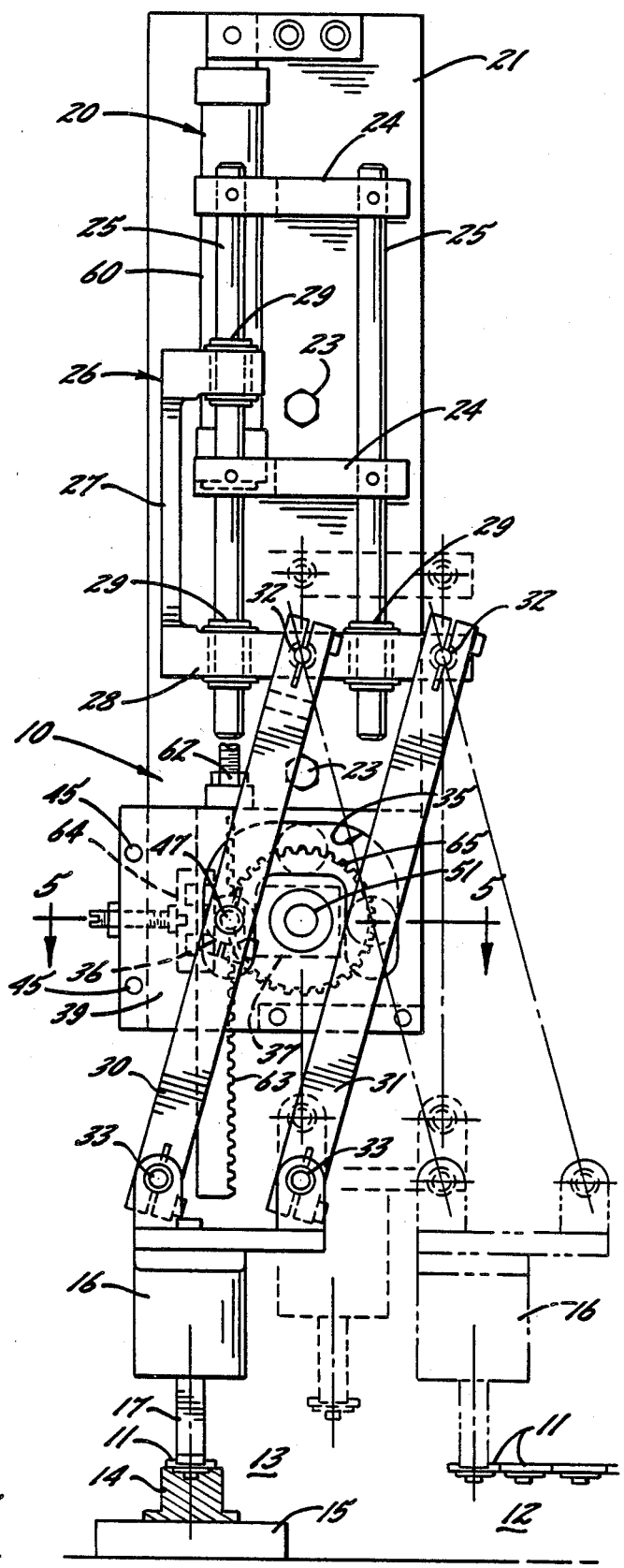
FIG. 2 is a front elevational view of the machine shown in FIG. 1.

To gain an understanding of the operation of the machine as described thus far, assume that the parts handling head 16 is in the pick-up station 12 as shown in phantom lines at the far right in FIG. 2 and that the jaws 17 have closed on the part 11 in the pick-up station. When the head is in this location, the crank arm 37 points to a three o'clock position and the cam follower 36 is located about midway along the length of the vertical leg 40 of the cam slot 35 as shown schematically by the dotted circle designated 36a in FIG. 3.

A cycle is initiated by rotating the crank arm 37 counterclockwise thereby causing the crank arm to apply a generally upwardly directed force to the link 30 and the pin 47. During initial counterclockwise rotation of the crank arm, the cam follower 36 travels vertically upwardly in the vertical leg 40 of the cam slot 35 and confines the link 30 to substantially vertical upward movement. Accordingly, the link 30 forces the slide 26 upwardly and, in turn, the slide pulls the link 31 upwardly. As a result of the parallelogram arrangement between the head 16, the links 30 and 31 and the lower arm 28 of the slide 26, the head is held in a level position as the head is raised verticlly by the links. During such raising, the head travels vertically through the same distance as the cam follower 36 and the crank pin 47 (i.e., a one-to-one ratio).

As the cam follower 36 approaches the horizontal leg 42 of the cam slot 35, continued counterclockwise rotation of the crank arm 37 causes the links 30 and 31 to swing clockwise about the pivots 32 and move the head 16 substantially horizontally from the pick-up station 12 toward the delivery station 13. The dotted circle designated 36b in FIG. 3 indicates the position of the follower 36 when the head 16 is midway through its horizontal stroke while the center dotted line illustration of the head in FIG. 2 shows the head in its fully elevated position and midway through its horizontal stroke. During horizontal movement of the head, the head moves twice as far as the cam follower 36 and the crank pin 47 (i.e., a two-to-one ratio) by virtue of the amplification provided by the crank pin acting midway along the length of the link 30. Thus, the horizontal stroke of the head 16 is long when compared to the vertical stroke so as to reduce the time required for raising the head while still enabling the part 11 to be moved through a relatively long distance from the pick-up station 12 to the delivery station 13.

Figure 3:
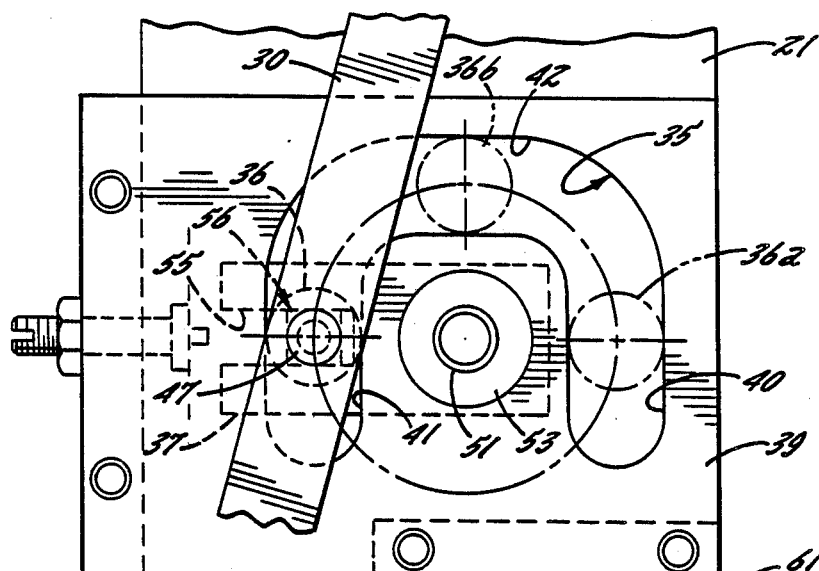
FIGS. 3 and 4 are enlarged fragmentary cross-sections taken substantially along the lines 3—3 and 4—4, respectively, of FIG. 1.

As the crank pin 47 approaches approximately the eleven o'clock position, the cam follower 36 starts down the vertical leg 41 of the cam slot 35 and causes the link 30 to move vertically downwardly as counterclockwise rotation of the crank arm 37 continues. The slide 26 is pulled downwardly to hold the link 31 in parallel relation with the link 30 and to cause the head 16 to lower vertically into the delivery station 13. As a result, the part 11 is positively placed down on the workpiece 14 when the crank pin 47 reaches the nine o'clock position. The jaws 17 then are opened to release the part 11, whereupon the crank arm 37 is turned clockwise to retract the head 16 upwardly, shift the head reversely toward the pick-up station 12 and then lower the head vertically into the pick-up station to pick up the next part. As shown in FIG. 3, the upper corner portions of the cam track 35 are gradually rounded so that the head makes a smooth transition from vertical motion to horizontal motion and vice-versa.

While the crank arm 37 could be rotated by a reversible rotary actuator such as a rotary stepping motor, the preferred actuator 20 for rotating the crank is—for purposes of low cost and simplicity of control—a reciprocating pneumatic actuator. The actuator 20 is shown most clearly in FIGS. 1 and 2 and comprises a cylinder 60 fastened rigidly to the main support plate 21 and having a rod 61 extending from its lower end. Secured rigidly to the lower end of the rod by a threaded connection 62 is an elongated toothed rack 63 (FIG. 4). The latter is backed rigidly by an adjustable pressure bearing 64 (FIGS. 4 and 5) on the connecting plate 43 and meshes with a pinion 65 which is keyed at 66 to the hub 50 of the crank 37.

When the upper end of the cylinder 60 is pressurized, the rod 61 and the rack 63 are advanced downwardly to cause the rack to turn the pinion 65 and the crank 37 counterclockwise. Conversely, pressurization of the lower end of the cylinder 60 effects retraction of the rod and the rack to turn the pinion and the crank in a clockwise direction. The reciprocating pneumatic actuator 20 is of relatively simple and low cost construction and may be operated and controlled with systems compatible with the systems of other equipment (e.g., automatic assembly machines) with which pick and place machines are commonly associated.

A further embodiment of a pick and place machine 10' incorporating the features of the invention is shown in FIGS. 7 to 9 in which parts corresponding to those of the first embodiment are indicated by the same but primed reference numerals. The machine 10' is particularly characterized by unique means for converting the reciprocating motion of the actuator 20' into oscillating motion of the crank 37'. The motion converting means are extremely quiet in operation, enable easy and precise adjustment of the starting and stopping points of the head 16', and avoid interference with the work zone at the delivery station 13.

Herein, the motion converting means comprise at least one and preferably two toothed or cogged endless belts 70 such as inexpensive and commercially available timing belts made of rubber or other relatively flexible elastomeric material. The belts are spaced laterally from one another and are trained around a pair of lower toothed pulleys or sprocket wheels 71 which are fixed rigidly to the hub 50' of the crank 37'. In addition, the belts are trained around a pair of upper toothed pulleys or sprocket wheels 72 which are rotatable on a horizontal spindle 73. The spindle 73 is supported by a bracket 74 which is adjustably mounted on the main support plate 21' and which may be shifted vertically to enable the belts 70 to be properly tensioned between the sprockets 71 and 72.

As shown in FIG. 7, the rod 61' of the actuator 20' is centered between the two belts 70 and is connected to both belts in order to balance the force applied by the actuator. To fasten the rod 61' to the belts 70, connecting means in the form of two substantially flat blocks 75 and 76 (FIG. 9) are secured to the lower end of the rod 50 by an adjustable threaded connection 62' and are located such that one run of each belt is sandwiched between the blocks. The inboard face of the block 75 is formed with teeth or cogs which mate with the cogs of the belts, the blocks being clamped tightly but releasably to one another by screws 80 or other releasable fasteners. As a result, the belts are gripped tightly between the blocks 75 and 76 and are prevented from slipping relative to the blocks by virtue of the cogs on the block 75 engaging the cogs on the belts.

With the foregoing arrangement, downward advancement of the actuator rod 61' is transmitted to the belts 70 by the blocks 75 and 76 to cause the belts to turn the sprockets 71 and the crank 37' in a counterclockwise direction. When the rod is retracted upwardly, the belts effect reverse rotation of the sprockets and the crank.

The action of the elastomeric belts 70 against the sprockets 71 and 72 produce virtually no noise and thus the machine 10' is quieter than the machine 10 of the first embodiment. In addition, the entire drive to the crank 37' is located at all times at the elevation of the sprockets 71 and thus, when the actuator rod 61' is at the lower end of its stroke as shown in FIGS. 7 to 9, there are no drive components (such as the rack 63) which project into the work zone adjacent the delivery station 13.

The belts 70 and the blocks 75 and 76 also enable the elevation of the part pick-up and delivery points to be adjusted quite easily. Assume, for example, that the pick-up station 13 is, by necessity, located at a higher elevation than the delivery station 12 so that the distance through which the part 11 is lowered is greater than the distance through which the part is raised. The machine 10' may be easily modified to suit such conditions simply by loosening the screws 80 and the blocks 75 and 76 and re-positioning the belts 70 between the blocks so that the cam follower 36' is at a higher elevation in the vertical leg 40' of the slot 35' when the actuator rod 61' is at the top of its stroke. Accordingly, the timing or phasing between the rod 61' and the crank 37' may be changed easily and in small increments determined by the spacing between the cogs on the belts 70. If an even finer adjustment is required after the blocks 75 and 76 have been reclamped to the belts 70, the threaded connection 62' between the rod 61' and the blocks may be adjusted slightly to raise or lower the blocks through a very short distance to effect such adjustment.

It will be appreciated that the detachable cam plates 39 and 39' are of very simple construction and that plates with different slots 35 and 35' may be used to produce the desired motion. By comparing FIGS. 8 and 2, for example, it will be seen that the cam slot 35' is shaped to permit greater vertical and horizontal displacement of the head 16' than is the cam slot 35. In some instances, and particularly when a heavy part is being handled, it may not be desirable to lift the part vertically out of the pick-up station 12. In such an instance, the pick-up station is located above the delivery station 13, the parts 11 are released from the pick-up station by an escapement (not shown) and the head 16, 16' simply grips the part, moves horizontally out of the pick-up station, and then lowers the part vertically into the delivery station. In other words, the head moves along an inverted L-shaped path, and the slots 35 and 35' can be easily designed to cause movement along such a path. Those familiar with the art also will appreciate that the machines 10 and 10' need not necessarily operate in the vertical orientation which has been shown but instead can be oriented horizontally or at an incline.

I claim:

1. A pick and place machine for gripping a part at a first station, for shifting the part along a substantially straight first path toward a second station and for then moving the part along a second and generally right-angled path to said second station for release of the part therein, said machine comprising a main support, a head selectively operable to grip and release parts, a slide mounted for back and forth movement on said support, a pair of parallel links having first end portions pivotally connected to said slide and having opposite end portions pivotally connected to said head, a crank having one end portion mounted on said support to turn about a predetermined axis and having an opposite end portion movably connected to one of said links, a single selectively reversible actuator having a rod adapted to be reciprocated back and forth, a first pair of aligned pulleys rotatably mounted on said support, a second pair of aligned pulleys rotatably mounted on said support, one pulley of each pair being rotatable about said axis and being coupled rigidly to said crank, first and second flexible and endless belts trained around the pulleys of said first and second pairs, respectively, connecting means extending between and being attached rigidly to said belts and being selectively adjustable relative to said belts along the length thereof in order that the locations of said first station and said second station may be precisely adjusted, said rod being fastened to said connecting means between said belts and being operable when moved back and forth to turn the crank first in one direction and then the other about said axis to cause said slide to shift back and forth and to cause said links to pivot relative to said slide, and coacting cam means on said support and one of said links for controlling said slide and said links to cause said head to move first along said first path and then along said second path during turning of said crank in one direction and to move reversely along said second path and then reversely along said first path during turning of said crank in the other direction.

2. A pick and place machine as defined in claim 1 in which said cam means are shaped to cause said head to move along a path extending substantially parallel to said second path before said head begins moving along said first path.

3. A pick and place machine as defined in claim 1 in which said cam means comprise a slotted plate rigid with said main support, and a cam follower connected to one of said links and sized to ride within said slot.

4. A pick and place machine for picking up and raising a part at a first station, for then shifting the part generally horizontally toward a second station, and for then lowering the part into and releasing the part at the second station, said machine comprising a main support, a slide mounted to move upwardly and downwardly on said main support, a head selectively operable to grip and release parts, a pair of parallel links having upper end portions pivotally connected to said slide and having lower end portions pivotally connected to said head, a crank having one end portion mounted on said main support to turn about a first generally horizontal axis, means connecting the opposite end portion of said crank to one of said links between the ends thereof to enable such link to slide relative to said crank and to pivot relative to said crank about a second axis extending parallel to said first axis, a selectively reversible reciprocating actuator having a rod adapted to be moved upwardly and downwardly, a first pair of upper and lower vertically aligned sprockets rotatably mounted on said support, a second pair of upper and lower vertically aligned sprockets rotatably mounted on said support, said lower sprockets being rotatable about said first axis and being coupled rigidly to said crank, first and second flexible and endless toothed belts trained around said sprockets of said first and second pairs, respectively, connecting means extending between and being attached rigidly to said belts and being selectively adjustable relative to said belts along the length thereof in order that the locations of said first station and said second station may be precisely adjusted, said rod being fastened to said connecting means between said belts and causing said belts to turn said crank back and forth about said first axis in response to up and down movement of said rod, a cam plate mounted on said support and having a cam track generally in the shape of an inverted U, a roller follower carried by said one link to turn about said second axis and guided by said cam track, said crank, said cam and said follower coacting to shift said slide and pivot said links in such a manner as to cause said head to raise out of said first station, then to move substantially horizontally toward said second station and then to lower into said second station as said crank is turned in one direction about said first axis.

5. A pick and place machine as defined in claim 4 in which said cam follower is carried by the same link to which said opposite end portion of said crank is connected.

6. A pick and place machine as defined in claim 5 in which said cam track is a slot formed in said cam plate, said cam follower comprising a roller located in said slot, and pin means rotatably supporting said roller and connected to said opposite end portion of said crank.

7. A pick and place machine as defined in claim 6 in which said opposite end portion of said crank is formed with an elongated slot, and means mounting said pin means to move back and forth along said elongated slot.

8. A pick and place machine as defined in claim 4 in which said connecting means are vertically adjustable relative to said rod.

9. A pick and place machine as defined in claim 4 in which said connecting means comprise a pair of opposed blocks, one run of each of said belts being sandwiched between and being clamped releasably by said blocks.

10. A pick and place machine as defined in claim 4 in which the rod of said actuator is located in a substantially centered position between said belts in order to balance the force applied to the belts by the actuator.

* * * * *